United States Patent [19]
Lindberg

[11] Patent Number: 5,401,362
[45] Date of Patent: Mar. 28, 1995

[54] CONTROL OF METALS AND DISSOLVED ORGANICS IN THE BLEACH PLANT

[75] Inventor: Hans G. Lindberg, Glens Falls, N.Y.

[73] Assignee: Kamyr, Inc., Glens Falls, N.Y.

[21] Appl. No.: 35,478

[22] Filed: Mar. 24, 1993

[51] Int. Cl.⁶ .................................................. D21C 11/00
[52] U.S. Cl. ........................................ 162/37; 162/38; 162/65; 162/76; 162/78; 162/90; 162/63
[58] Field of Search ....................... 162/29, 38, 39, 40, 162/45, 57, 65, 78, 79, 76, 90, 63, 37; 210/718, 725, 728, 928

[56] References Cited

U.S. PATENT DOCUMENTS

| | | | |
|---|---|---|---|
| 4,761,238 | 8/1988 | Hynninen | 210/725 |
| 4,812,207 | 3/1989 | Gullichsen et al. | 162/29 |
| 4,842,688 | 6/1989 | Gullichsen et al. | 162/29 |
| 5,013,454 | 5/1991 | Hynninen | 210/718 |
| 5,120,448 | 6/1992 | Dorica et al. | 210/724 |
| 5,143,580 | 9/1992 | Basta et al. | 162/76 |
| 5,188,708 | 2/1993 | Griggs et al. | 162/65 |
| 5,202,030 | 4/1993 | Axnäs et al. | 210/928 |

FOREIGN PATENT DOCUMENTS

| | | | |
|---|---|---|---|
| 54-15005 | 2/1979 | Japan | 162/29 |
| WO88/04706 | 6/1988 | WIPO . | |

OTHER PUBLICATIONS

Teder et al, "The Recycling of Acidic Bleach Plant Effluents . . .", 1989 Pulping COnference, pp. 751-759.
Netzer, et al. "Removal of Trace Metals from Wastewater by Lime and Ozination" Proceedings of the First International Symposium on Ozone for water and Wastewater Treatment, International Ozone Assn., Vienna, VA, 1975.
Lin, et al. "Looking to Treat Wastewater? Try Ozone" *Chemical Engineering*, May 1993.

*Primary Examiner*—Steve Alvo
*Attorney, Agent, or Firm*—Nixon & Vanderhye

[57] ABSTRACT

Transition metals are removed from cellulose pulp and treatment fluids in a pulp mill. Medium consistency digested pulp is treated in an acidic stage, and then washed to produce a filtrate. The pH of at least a substantial part of the filtrate is adjusted so that it is greater than 9 (preferably greater than 10.5), while a sufficient carbonate content is provided to keep the calcium content low. Adjusting the pH causes dissolved transition metals in the filtrate to precipitate as solids, and the solids can then be filtered out, e.g. by precoat filtering, or clarification followed by polishing filtering. The greatly reduced transition metal content filtrate is then used elsewhere in the pulp mill, as in a washer following an oxygen delignification stage. The acidic stage may be an EDTA stage, an ozone stage, an acid only stage, etc., and the pulp is preferably treated so that it is bleached in at least one Z stage and one P stage, and preferably also an E (e.g. $E_{op}$) stage.

19 Claims, 1 Drawing Sheet

CONTROL OF METALS AND DISSOLVED ORGANICS IN THE BLEACH PLANT

BACKGROUND AND SUMMARY OF THE INVENTION

It has been recognized that one of the best ways of minimizing the environmental impact on the production of kraft pulp is to bleach the pulp without using chlorine or chlorine containing chemicals. Chemicals for this purpose include ozone, hydrogen peroxide, peracetic acid and like chemicals, and also oxygen for effecting delignification. One problem in treatment of pulp with these chemicals, however, is that transition metal ions (e.g. Mn, Fe, and Cu) if present in sufficient amount, affect the selectivity of the bleaching reactions, and thus can make the bleaching uneconomical. Conventional techniques for removing transition metals include evaporation, acid treatment, or acid treatment combined with chelation.

According to the present invention, a method is provided for removing transition metals from the treatment fluids in a cellulose pulp mill (typically a kraft mill) in a manner that renders the treated fluid reusable in the cellulose pulp mill. The treated fluid can be reused as needed in the fiberline, including in bleaching, or in the recovery area. The method is based upon the fact that zinc, cobalt, manganese, iron, copper, and the like precipitate out as solids if the pH is raised so that the liquid containing the dissolved metals is sufficiently alkaline. Typically if the pH is greater than 9, and preferably above 10.5, the metals precipitate out and can readily be filtered.

The precipitation can, according to the present invention, be aided by maintaining a certain concentration of suspended solids in the fluid being treated. These solids are added as lime, lime milk, lime mud, green liquor dregs, and/or slaker grits. The solids added will provide growth sites for the precipitating material and will also aid settling and filtration.

Other non-conventional methods of treating acidic bleach plant effluents include ultra-filtration and/or evaporation. However, these processes are much more energy and capital intensive than the process of the present invention.

According to the present invention, the source of alkali to raise the pH can be varied, but normally includes some type of lime, lime mud, lime milk, or slaker grits, and preferably some green or white liquor (clarified or unclarified, oxidized or unoxidized) or alkaline bleach plant effluents (as from a peroxide stage). A combination of alkaline liquids is preferred since it is desirable not only to obtain a high enough pH but at the same time maintain the calcium content at a minimum by maintaining a sufficient concentration of carbonate ions (at least about 0.01 moles per liter, and preferably about 0.05 moles per liter). Such a treatment can also have the benefits of removing oxalate, barium, calcium, sulfate, and possibly some of the organics, resulting in less scaling and reduced build up of sulfate in the bleach plant.

An additional source for carbonate ions can be carbon dioxide, e.g. from the flue gas from either the lime kiln, recovery boiler or a hog fuel boiler. Part of the liquor under treatment can be used to absorb carbon dioxide from the flue gas, or an external source of $CO_2$. The carbon dioxide can be bubbled through the treated effluent, or can be scrubbed with effluent in a conventional scrubber.

Filtering can be accomplished by slurrying the filtrate with lime mud and passing it over a precoat filter, or by clarifying the filtrate and then using a polishing filter, or even ultra-filtration. If the source of alkaline medium used in the reactor contains particulates e.g., lime mud, slaker grits, etc., no filtering aid need be added prior to filtration. The particulates present in the treated effluent will act as a filtering aid.

According to one aspect of the present invention, a method of removing transition metals from treatment fluids in a cellulose pulp mill is provided which comprises the following continuous steps: (a) Treating digested pulp in an acidic or neutral stage to dissolve transition metals. (b) Washing the pulp after step (a) to produce a filtrate containing dissolved transition metals. (c) Adjusting the pH of at least a substantial part of the filtrate from step (b) so that it is greater than 9, while providing a filtrate carbonate content of at least about 0.01 mole/l., to cause dissolved transition metals in the filtrate to precipitate as solids in the pH adjusted filtrate. (d) Filtering the solids containing transition metals from the pH adjusted filtrate of step (c) to produce a greatly reduced transition metal content filtrate. And, (e) using the greatly reduced transition metal content filtrate elsewhere in the pulp mill.

Step (a) may be an ozone stage, or a chelation stage (such as an EDTA stage, an acid only stage, or a combination EDTA and acid stage). After step (b) the pulp may be further treated in at least one Z bleach stage at least one P bleach stage, and also preferably in at least one E stage (e.g. an $E_{op}$) stage.

Step (c) is preferably practiced to adjust the pH so that it is greater than 10.5, and may be practiced by adding a material selected from the group consisting essentially of lime (e.g. reburned lime or slaked lime), lime milk, lime mud, slaker grits, alkaline bleach plant effluent, white liquor, green liquor, and mixtures thereof. The green and white liquor may be clarified or unclarified, oxidized or unoxidized. It is desirable to practice step (c) by adding carbonate ion so that the filtrate has a carbonate level of approximately 0.05 moles per liter, and the carbonate ion may be provided by using clarified or unclarified green or white liquor as part of the liquid used for pH adjustment. The carbonate ion may also be provided by means of carbon dioxide, for example from a mill combustion process.

Step (e) is typically practiced in a reactor. The temperature at which reaction takes place and the time of reaction are dependent upon the source of the acidic effluent. If the source is an ozone stage, the effluent arrives at the reactor at about 30°–70° C. and requires about 40–60 minutes reaction time. If the source is a chelating stage, the effluent arrives at the reactor at about 70°–90° C. and requires about 5–30 minutes reaction time. If it is desired to expedite the reaction, external heat can be provided (e.g. by indirect heating of the filtrate with steam).

Step (d) may be practiced by precoat drum filtering, precoat disc filtering, precoat planar filtering, or clarification followed by polishing filtering. Clarification may be practiced between steps (c) and (d) regardless of the method of filtration utilized. If an alkaline source containing particulate, e.g. lime mud, etc., is used, the particulate acts as a filter aid and a pre-coat filter may not be necessary.

While the greatly reduced transition metal content filtrate from step (e) may be used at a wide variety of locations within the pulp mill, one particularly good use is as wash liquid following an oxygen delignification stage.

According to another aspect of the present invention, a method of treating digested kraft pulp is provided which comprises the following steps: (a) Oxygen delignifying the kraft pulp. (b) Treating the oxygen delignified pulp in an acidic stage. (c) Washing the pulp after step (b) to produce a filtrate. (d) Adjusting the pH of at least a substantial part of the filtrate from step (b) so that it is about 10.5 or more. And, (e) filtering the pH adjusted filtrate.

According to still another aspect of the present invention there is provided a method of treating oxygen delignified medium consistency (e.g. about 6-18%) kraft pulp by the following steps: (a) Treating oxygen delignified medium consistency kraft pulp in an acidic stage to dissolve transition metals. (b) Washing the pulp after step (a) to produce a filtrate having dissolved transition metals. (c) Adjusting the pH of at least part of the filtrate from step (b) so that transitions metals in the filtrate precipitate as solids in the pH adjusted filtrate. And, (d) filtering the solids containing transition metals from the pH adjusted filtrate of step (c) to produce a greatly reduced transition metal content filtrate.

It is the primary object of the present invention to provide for the energy efficient removal of metal ions from cellulose pulp by acting upon liquids containing dissolved metal ions so that an effluent is produced, containing minimal metal ions, which can be used as needed in the pulp mill. This and other objects of the invention will become clear from an inspection of the detailed description of the invention, and from the appended claims.

DETAILED DESCRIPTION OF THE DRAWINGS

Figure 1:
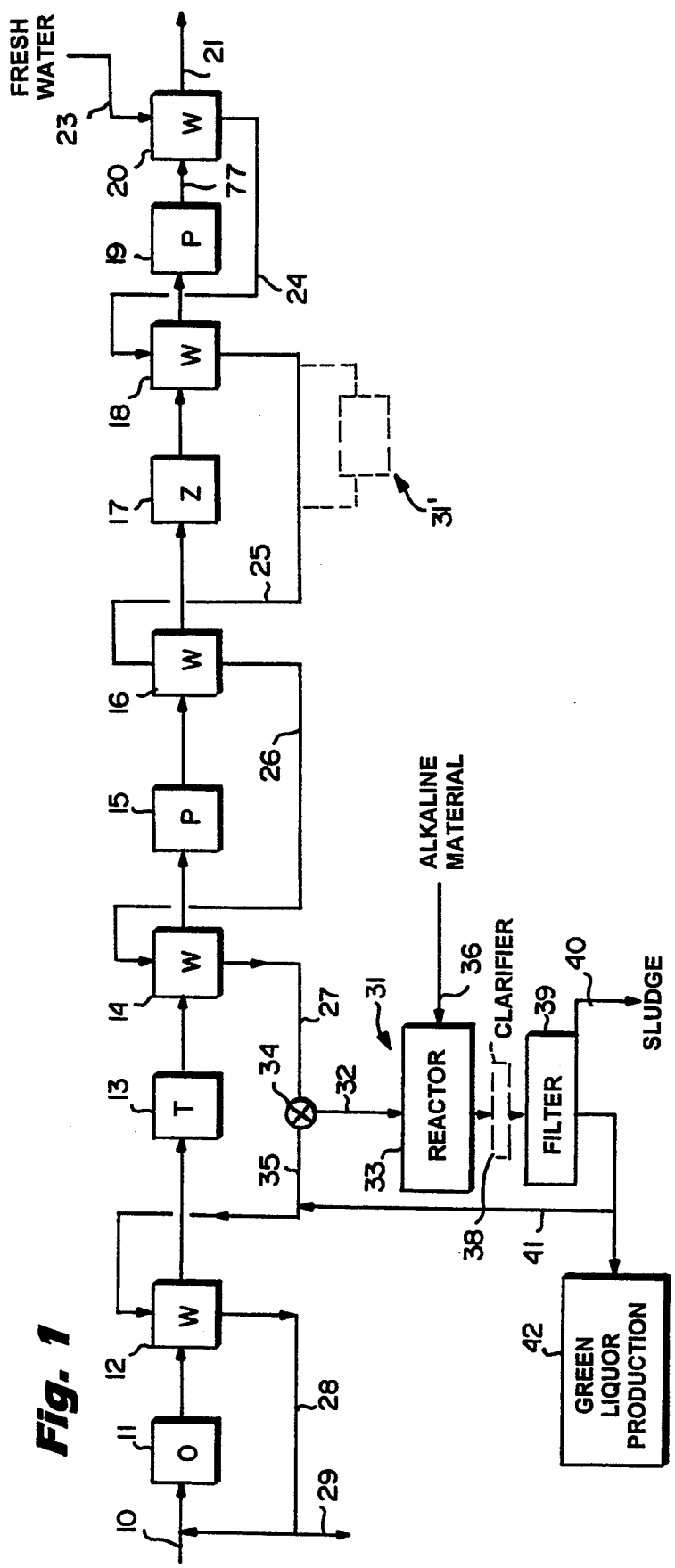
FIG. 1 is schematically illustrates an exemplary bleaching sequence for kraft pulp according to an exemplary method according to the present invention.

In FIG. 1, digested pulp, e.g. from a continuous kraft digester, in line 10 is acted upon to effect delignification and bleaching thereof. According to the present invention, this is accomplished by continuously removing metal ions (such as manganese, zinc, cobalt, iron, and copper) which consume bleaching chemicals (particularly ozone, peroxide, and oxygen) from an acidic effluent stream so as to minimize chemical consumption during bleaching. The metal-depleted alkaline effluent stream is then used as needed in the fiberline, including in the bleach stages.

In the embodiment illustrated in FIG. 1, the pulp in line 10 passes to oxygen reactor 11 where oxygen delignification takes place, and then the oxygen delignified pulp is subjected to a wash in washing stage 12. After washing stage 12 it passes to a chelating stage 13, e.g. an EDTA stage, an acid only stage, a combination EDTA-acid stage, etc. In the chelating stage 13 the pulp is subjected to an acidic or neutral treatment, dissolving transition metals. After the stage 13 the pulp is washed as indicated at stage 14, and then passes to various bleaching stages. For the particular sequence illustrated in FIG. 1, there is a first peroxide stage 15, followed by a wash 16, then a first ozone stage 17, followed by a wash 18, and then a second peroxide stage 19 followed by a final wash 20, the digested, delignified, bleached, and washed pulp of desired brightness that is produced being discharged in line 21. A number of modifications may be made of the bleaching sequence according to the invention, for example a ZEZP sequence may be utilized (the E stage may be an $E_{op}$ stage), with or without a chelating stage before the first Z stage, or a wide variety of other bleaching sequences may be utilized including a TCF sequence, or a D sequence.

In the practice of the exemplary method schematically illustrated in FIG. 1, fresh wash water is added at 23, and then the wash water from each subsequent stage is used as wash water in a previous stage. For example in the embodiment illustrated in the drawing wash water 24 from stage 20 is used in stage 18, wash water in line 25 from stage 18 is used in stage 16, wash water in line 26 from stage 16 is used in stage 14, and wash water in line 27 from stage 14 is used in stage 12. Fresh water can be utilized with various other washing stages besides the stage 20, as necessary, and the filtrate lines from each of the washing stages need not pass back to exactly the preceding stage, but to an earlier preceding stage (e.g. from one alkaline stage to another). The filtrate from stage 12 may be recirculated in line 28 to be added to the pulp, or may be otherwise treated, as shown schematically by line 29.

An exemplary treatment sequence according to the present invention is shown schematically and generally by reference numeral 31 in FIG. 1. In FIG. 1, the sequence 31 is shown in association with the T stage 13, but it may be utilized in association with any (or more than one) acidic stage, such as shown at 31' in FIG. 1 (there associated with a Z stage).

The sequence 31 has as the input thereof filtrate from line 27, which passes in line 32 to a reactor 33. A valve 34 may be provided in the line 27 for diverting a substantial portion of the filtrate in line 27 to the line 32, while allowing other filtrate—e.g. in line 35—to pass directly to the stage 12 without treatment. Typically at least about half of the filtrate in line 27 is diverted by valve 34 to line 32, but anywhere from about 25-100% may be diverted into lines 32.

In the reactor 33 alkaline material is added as indicated at 36 to adjust the pH of the filtrate so that it is greater than 9 (preferably greater than 10.5, and in a typical situation about 10-11), such a high pH causing the transition metals that were dissolved in stage 13, which have been washed out by wash stage 14 into filtrate line 27, to precipitate out. The alkaline material added in line 36 may be from a wide variety of alkali sources, such as a calcium source including lime (including reburned lime, slaked lime, $CaCO_2$, $Ca(OH)_2$, CaO, and the like), lime mud, lime milk, slaker grits, alkali bleach plant effluent (e.g. from a peroxide stage), clarified or unclarified green liquor, and/or clarified or unclarified white liquor. (The green and white liquors may be oxidized or unoxidized.)

It is desirable that at least some of the alkali material added in line 36 have a high enough concentration of carbonate ions so as to keep the calcium content to a minimum. Alkaline materials with carbonate ions include green and white liquor. The alkaline material may also be provided in the form of carbonate from carbon dioxide. The $CO_2$ may be obtained from any mill combustion process, e.g. the lime kiln, recovery boiler or hogged fuel boiler, or can be obtained from a commercial source (e.g. as a liquid). If in gaseous form, the $CO_2$ can be bubbled through the effluent, or can be scrubbed with effluent in a conventional scrubber (not shown) prior to reactor 33. Preferably during the practice of the sequence 31 a filtrate carbonate content of at least about 0.01 moles per liter, and preferably about 0.05 moles per liter, is provided, the amount of carbonate ion added to reactor 33 dependant upon the amount of carbonate ion already present in the filtrate in line 27.

It is preferred that the filtrate be maintained at a particular temperature for a particular period of time, at the desired alkaline pH conditions, in the reactor 33 in order to ensure sufficient precipitation of the manganese, iron, copper, zinc, cobalt, and like metal ions from the originally acidic filtrate. The temperature at which reaction takes place and the time of reaction are dependent upon the source of the acidic effluent. If the source is an ozone stage, the effluent arrives at the reactor at about 30°-70° C. and requires about 40-60 minutes reaction time. If the source is a chelating stage, the effluent arrives at the reactor at about 70°-90° C. and requires about 5-30 minutes reaction time. If it is desired to speed up the reaction (reduce the time in reactor 33) the filtrate in line 32 may be heated above the temperatures indicated above (e.g. with steam in an indirect heater). Furthermore, precipitation is enhanced by maintaining a minimum concentration of suspended solids in the treatment reactor. The alkaline sources containing particulate mentioned above, e.g. lime mud, slaker grits, etc., can be added to maintain the concentration of suspended solids.

One of the functions of such a reactor 33 is to gently agitate the reaction mixture to maintain the level of suspended solids and enhance precipitation.

The type of reactor 33 may vary widely, but preferably is a slaker type reactor, or a liquid fluidized bed where the bed is made up of lime mud or grits, and the bed aids in precipitation.

After treatment in reactor 33, the solid phase (precipitate) of the metal ions must be removed as efficiently as possible. An optional clarifier 38 may be used before the filtrate with precipitated solids is fed to the filter device 39. The conventional clarifier 38 is necessary if the filter 39 is a polishing type filter. The clarifier 38 is not necessary, though it may be desirable, if the filter 39 is a precoat filter of drum, disc, or planar type. The filter 39 may be a conventional drum filter.

The sludge from filter 39 passes in line 40 to further treatment, or typically to disposal. The filtrate in line 41, which has been filtered by filter 39, has a greatly reduced transition metal ion content compared to the filtrate in line 27, and may be used at a wide variety of locations within the mill. Preferably, line 41 connects back up to line 35, and the filtered filtrate is used in the wash stage 12 after the oxygen delignification stage 11 (an alkaline stage). Some part of the liquid in line 41 may pass to typical green liquor production stage 42, or will be otherwise used as necessary.

Table I below summaries laboratory trials for treating a Z-stage effluent in accordance with the present invention. In these laboratory trials, 100 ml filtrate samples were mixed with various concentrations of lime mud, slaker grits, and green liquor. The green liquor carbonate concentration was 1.44 moles/L. The mixtures were held at 40° C. for the times specified in Table I, and the ion concentrations of certain metals were determined, as listed. When comparing those samples for which broad metal analyses were done to the baseline sample (the first sample), it will be seen that there is very effective metals removal according to the invention (note that the increase in potassium concentration is insignificant as far as effectiveness of subsequent bleaching is concerned).

That is, for the two samples according to the invention in Table I for which a complete analysis was done the metal removal efficiencies were as follows: for Mg, 80% and 91%; for Mn, 98% and 98+%; for Fe, 86% and 91%.

TABLE I

| Sample Volume | Lime Mud | Slaker Grits | Green Liquor | Holding Time | pH | Conc Ca | Conc Mg | Conc K | Conc Mn | Conc Fe | Conc Ba | COD |
|---|---|---|---|---|---|---|---|---|---|---|---|---|
| 100 ml | | | | 10 min | 2.5 | 171 | 40 | 7.3 | 4.9 | 2.2 | <0.5 | 730 |
| 100 ml | 20.0 g/L | | | 10 min | 11.7 | 110 | | | | | | |
| 100 ml | 20.0 g/L | | 0.1 ml | 10 min | 11.8 | 105 | | | | | | |
| 100 ml | 20.0 g/L | | 0.7 ml | 10 min | 12.3 | 70 | | | | | | |
| 100 ml | 20.0 g/L | | 0.7 ml | 60 min | 12.3 | 35 | | | | | | |
| 100 ml | 20.0 g/L | | 7.0 ml | 10 min | 12.8 | 53 | | | | | | |
| 100 ml | 20.0 g/L | | 7.0 ml | 60 min | 12.8 | 34 | 0.2 | 1315 | 0.1 | 0.3 | <0.5 | 2620 |
| 100 ml | | 20.0 g/L | | 10 min | 11.9 | 1081 | | | | | | |
| 100 ml | | 20.0 g/L | 1.0 | 10 min | 12.2 | 476 | | | | | | |
| 100 ml | | 20.0 g/L | 0.7 | 10 min | 12.3 | 590 | | | | | | |
| 100 ml | | 20.0 g/L | 7.0 | 10 min | 13.0 | 44 | | | | | | |
| 100 ml | | 20.0 g/L | 7.0 | 60 min | 13.0 | 15 | 0.1 | 1155 | <0.1 | 0.2 | <0.5 | 2330 |

During treatment of the pulp in the various stages 13, 15, 17, 19, it is preferred, although not necessary, that the pulp be at medium consistency (e.g. about 6-18%). While the method according to the invention is particularly advantageous for kraft pulp, it may be utilized for other chemical pulps, thermomechanical pulp, chemimechanical pulp, etc.

While the invention has been herein shown and described in what is presently conceived to be the most practical and preferred embodiment thereof it will be apparent to those of ordinary skill in the art that many modifications may be made thereof within the scope of the invention, which scope is to be accorded the broadest interpretation of the appended claims so as to encompass all equivalent methods and processes.

What is claimed is:

1. A method of removing transition metals from treatment fluids in a cellulose pulp mill, comprising the steps of continuously:

(a) treating digested pulp in an acidic or neutral stage to dissolve transition metals;

(b) washing the pulp after step (a) to produce a filtrate containing dissolved transition metals, which filtrate is separate and distinct from the pulp;

(c) adjusting the pH of at least a substantial part of the filtrate from step (b) so that it is greater than 9, while providing a filtrate carbonate content of at least about 0.01 mole/l., to cause dissolved transition metals in the filtrate to precipitate as solids in the pH adjusted filtrate;

(d) filtering the solids containing transition metals from the pH adjusted filtrate of step (c) to produce a greatly reduced transition metal content filtrate; and (e) using the greatly reduced transition metal content filtrate elsewhere in the pulp mill.

2. A method as recited in claim 1 wherein step (c) is practiced by adding a material selected from the group consisting of lime, lime milk, lime mud, slaker grits, alkaline bleach plant effluent, white liquor, green liquor, and mixtures thereof.

3. A method as recited in claim 2 wherein step (c) is further practiced by adding carbonate ion so that the filtrate has a carbonate level of approximately 0.05 mole/l.

4. A method as recited in claim 3 wherein the carbonate source is selected from the group consisting of $CO_2$, white liquor, and green liquor.

5. A method as recited in claim 2 wherein step (c) is practiced so as to adjust the pH to greater than 10.5.

6. A method as recited in claim 1 wherein step (c) is practiced to add green or white liquor to the filtrate.

7. A method as recited in claim 1 wherein the stage in step (a) is an ozone stage, and wherein step (c) is practiced in a reactor at a temperature of about 30°–70° C., for roughly about 40–60 minutes.

8. A method as recited in claim 1 wherein the stage in step (a) is a chelating stage, and wherein step (c) is practiced in a reactor at a temperature of about 70°–90° C., for roughly about 5–30 minutes.

9. A method as recited in claim 1 wherein step (c) is practiced by adding $CaCO_2$, $Ca(OH)_2$, or $CaO$, and also adding green liquor, carbon dioxide, or white liquor.

10. A method as recited in claim 1 wherein step (a) is practiced utilizing an acidic stage selected from the group consisting of an ozone stage, an EDTA stage, an acid only stage, and a combination EDTA and acid stage.

11. A method as recited in claim 1 wherein step (d) is practiced by utilizing a method selected from the group consisting of drum filtering, precoat drum filtering, precoat disc filtering, precoat planar filtering, and clarification followed by polishing filtering.

12. A method as recited in claim 11 comprising the further step of also treating the pulp from step (b) in at least one E stage.

13. A method as recited in claim 1 comprising the further step of clarifying the filtrate between steps (c) and (d).

14. A method as recited in claim 1 wherein the pulp is kraft pulp, and comprising the further steps, after step (b), of treating the pulp in at least one Z bleach stage and at least one P bleach stage.

15. A method as recited in claim 1 wherein step (e) is practiced by using the filtrate as wash liquid following an oxygen delignification stage.

16. A method as recited in claim 1 wherein step (e) is practiced by using the filtrate prior to an alkaline stage.

17. A method as recited in claim 1 wherein step (c) is practiced so as to adjust the pH to 10.5 or more, and wherein the pulp has a consistency of between about 6–18% during the practice of steps (a) and (b).

18. A method as recited in claim 1 wherein step, (c) is practiced in a reactor, and comprising the further step (f) of maintaining a solids concentration in the reactor sufficiently high to enhance precipitation.

19. A method as recited in claim 18 comprising the further step (g) of gently agitating the reaction mixture in the reactor to facilitate maintaining a high level of suspended solids and enhance precipitation.

* * * * *